Jan. 24, 1961 S. MARGULIES 2,968,937
KNITTED FABRICS AND METHODS OF CLOSING SAME
Filed June 19, 1958 5 Sheets-Sheet 2
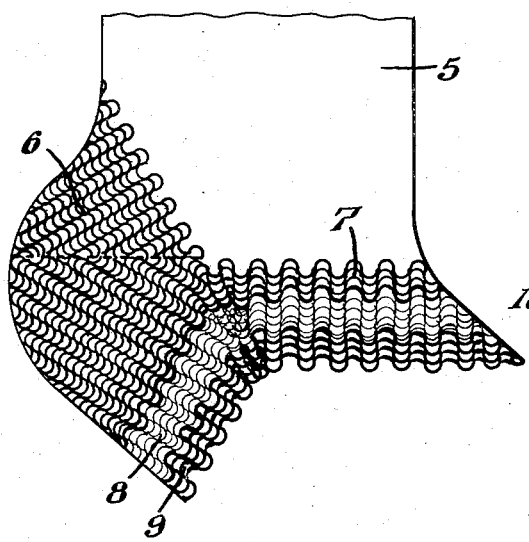
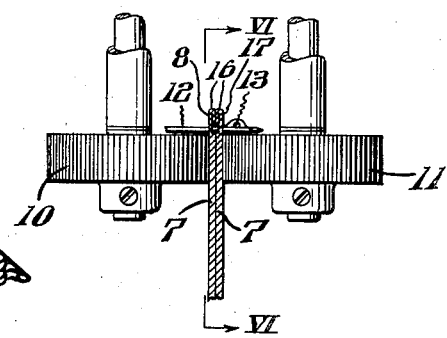
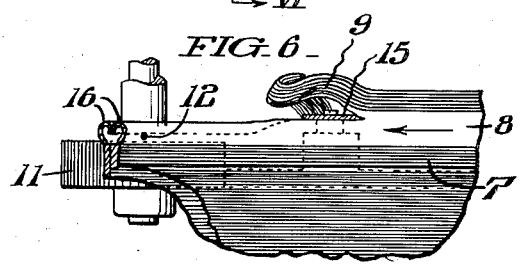
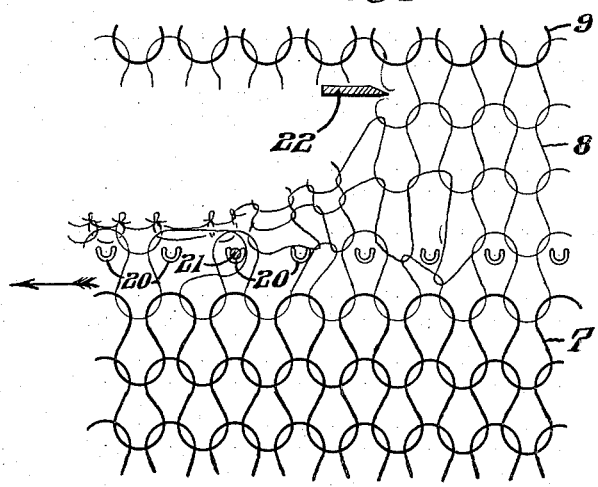
INVENTOR.
Samuel Margulies,
BY
ATTORNEYS Jan. 24, 1961 S. MARGULIES 2,968,937
KNITTED FABRICS AND METHODS OF CLOSING SAME
Filed June 19, 1958 5 Sheets-Sheet 3

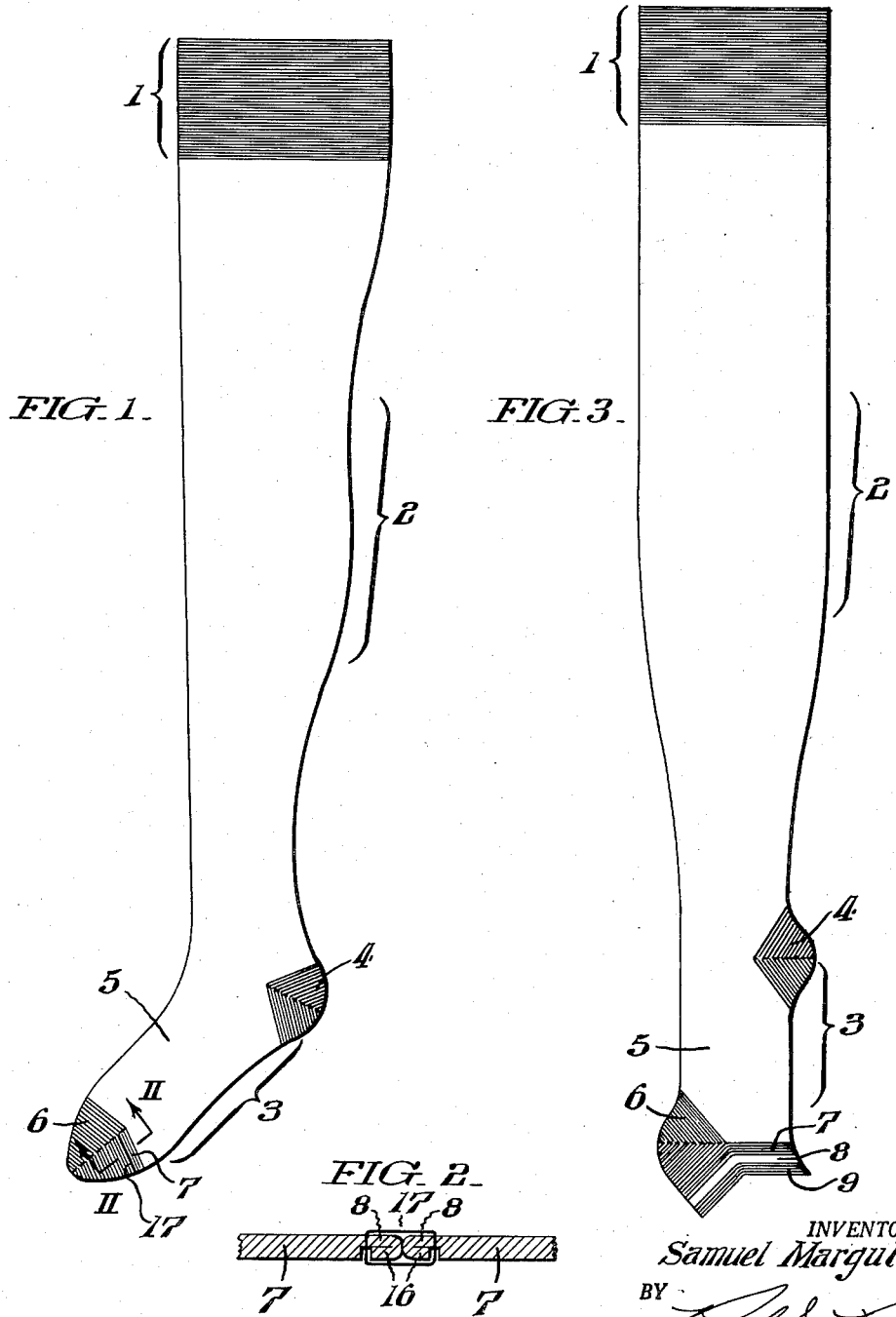

INVENTOR.
Samuel Margulies,
BY
ATTORNEYS

Jan. 24, 1961  S. MARGULIES  2,968,937
KNITTED FABRICS AND METHODS OF CLOSING SAME
Filed June 19, 1958  5 Sheets-Sheet 4

INVENTOR.
Samuel Margulies,
BY
ATTORNEYS

Jan. 24, 1961 S. MARGULIES 2,968,937
KNITTED FABRICS AND METHODS OF CLOSING SAME
Filed June 19, 1958 5 Sheets-Sheet 5
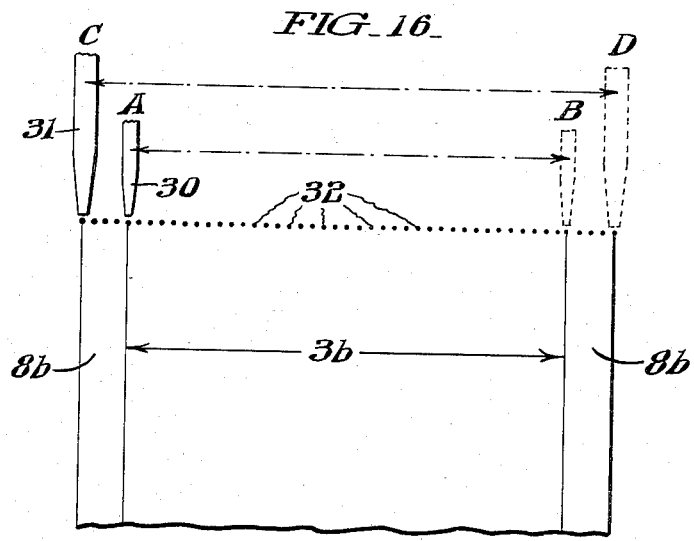
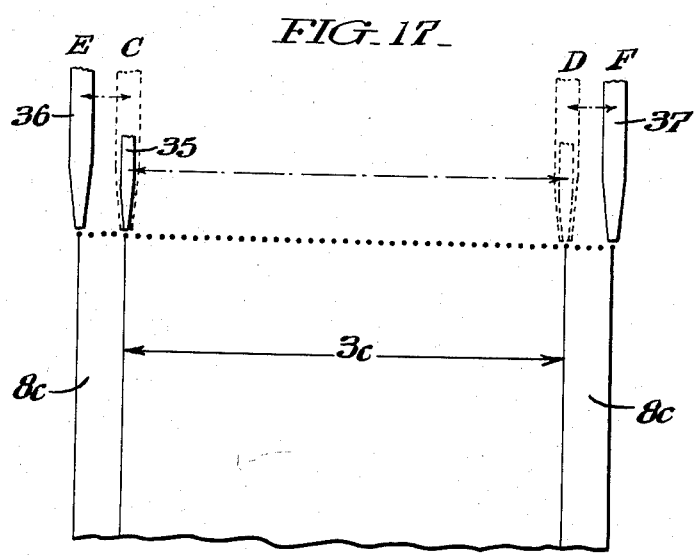
INVENTOR.
Samuel Margulies,
BY
ATTORNEYS

United States Patent Office 2,968,937
Patented Jan. 24, 1961

2,968,937

KNITTED FABRICS AND METHODS OF CLOSING SAME

Samuel Margulies, 1215 Devereaux Ave., Philadelphia, Pa.

Filed June 19, 1958, Ser. No. 743,185

10 Claims. (Cl. 66—187)

This invention relates to knitted fabrics. More specifically, it is concerned with the closing of knitted fabrics, as, for example, in closing the toe openings of circular-knit stockings, and in uniting the opposite side edges of flat-knitted profiled blanks for so-called full fashioned stockings, leotards, sweaters, panties, etc.

This application is a continuation in-part of my previous patent application, Serial No. 691,825, filed by me on October 23, 1957, now abandoned, which in turn is a continuation-in-part of my still previous patent application, Serial No. 668,959, filed by me on July 1, 1957, now abandoned.

In connection with circular-knit stockings, the chief aim of my invention is to make possible the closing of the toe openings without having to resort to the slow, tedious and costly looping operation heretofore utilized. Further objects of my invention in respect of circular-knit stockings are to provide a toe closure seam which approximates the thickness of the adjacent fabric, and is therefore substantially inconspicuous, and to provide a seam by which the raw fabric edges are securely connected against development of runs or ladders.

In connection with flat-knitted fabrics, an object of my invention is to provide for joining the opposite side edges of the profiled blanks in such maner as to preclude the formation of heavy, bulky seams.

How the foregoing and other objectives and attendant advantages are realized in practice will appear from the following detailed description of the attached drawings, wherein:

Fig. 1 shows a lady's seamless stocking having its toe pocket closed and seamed in accordance with my invention.

Fig. 2 is a fragmentary, diagrammatic view in section taken as indicated by the angled arrows II—II in Fig. 1 crosswise through the closure seam of the toe pocket.

Fig. 3 shows a flattened lady's seamless stocking blank made in accordance with my invention.

Fig. 4 is a fragmentary view, drawn to a larger scale, showing exaggeratedly the loop structure of the toe end of the stocking blank.

Fig. 5 is a fragmentary view showing how a sewing machine of the cup feed type may be utilized to close the toe pocket of the stocking blank.

Fig. 6 is a fragmentary view looking as indicated by the angled arrows VI—VI in Fig. 5.

Fig. 7 is a fragmentary view showing how a looping machine of the dial type may be utilized to close the toe pocket of the stocking blank.

Fig. 8 is a fragmentary diagramamtic view looking as indicated by the angled arrows VIII—VIII in Fig. 7.

Fig. 16 is a diagrammatic view showing one method of knitting the blank of Fig. 15 on a straight machine in accordance with my invention; and Fig. 17 is a view similar to Fig. 16 illustrating an alternative method of knitting.

Figure 11:
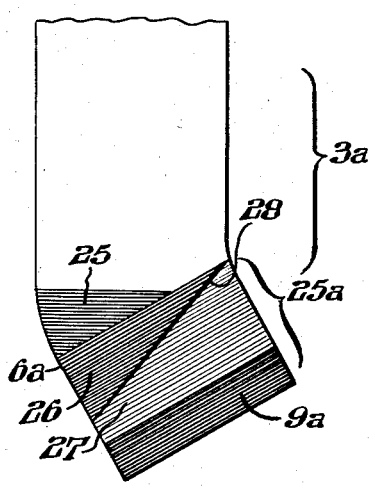
Fig. 11 shows the flattened toe end of the blank for the stocking of Fig. 9.

Referring first to Figs. 1–8, the stocking blank illustrated in Figs. 3 and 4 for the seamless stocking of Fig. 1 is produced on a conventional circular knitting machine with a closed welt 1, a leg portion 2, shaped by gradual reduction in the size of the fabric loops, and a foot 3 having the usual heel pocket 4, instep 5 and toe pocket 6. Let it be assumed, for the purpose of description, that the main portion of the blank is knitted from fifteen denier nylon yarn, while the heel and toe pockets are knitted from a relatively heavy yarn, such as fifty denier nylon.

After knitting the toe pocket 6 from the heavy yarn, by reciprocation of the needle cylinder in the usual manner, I put all of the needles back into action, and proceed to knit courses 7 of the heavy yarn and of a light yarn, the two yarns being doubled in the loops of the courses 7. The light yarn preferably is finer than any yarn previously used in the knitting of the stocking blank. It is desirable, although not essential, that the fine yarn be on the order of half the thickness of the main body yarn of the stocking blank. Thus, if fifteen denier yarn is used as the main body yarn, then the fine yarn of the courses 7 preferably should be on the order of seven and a half denier. The courses 7, in the practice of my invention, are few in number, preferably comprising about two to six courses, although any convenient number will suffice for the purpose of this invention.

After completion of the courses 7, I withdraw the heavy yarn and proceed to knit a number of courses 8 from the fine yarn. The courses 8 preferably are few in number. In most cases, four to eight courses 8 will be sufficient. It is to be noted that the common axis of the courses 7 and 8 is displaced somewhat at an angle to the axis of the leg portion 2 of the stocking blank. After completion of the courses 8, the usual final courses 9 are knit of a heavy yarn, such as No. 50 cotton yarn.

The toe opening is closed, following removal of the stocking blank from the knitting machine, by flattening the blank so that the fabric portions composed of the courses 7 and 8 are disposed in contiguous relation, as shown in Fig. 3, and then stitching a seam 17 across, i.e. to overlap, the contiguous fabric. Preferably, as shown in Figs. 2, 5 and 6, the seam 17 is stitched across the flattened, contiguous fine yarn fabric 8 along a line adjacent (or else spaced slightly from) the heavy yarn courses 7. However, if desired, seam 17 may be stitched across the heavy yarn fabric 7 along a line adjacent or spaced slightly from the light yarn courses 8, provided the seam overlaps the courses 8. It will be understood, however, when the seam is stitched across the fabric of courses 7, the further removed the line of stitches is from the fine yarn courses 8, the heavier will be the resulting seam.

If desired, the stocking blank of Fig. 3 may be knit without a heel or toe pocket, in the form of an elongated tube. In such event, I preferably stitch the seam across the flattened tubular blank along a more or less diagonally curved line. In such case, the seam 17 may be stitched across either the fine yarn fabric 8 or the heavy yarn fabric 7, as above described, or it may be stitched initially across the fine yarn fabric 8 and then curved slightly to pass into the heavy yarn fabric 7 before reaching its terminal point.

In Figs. 5 and 6 there is shown, in partial illustration, the stitching of the seam by any well known over-edge sewing machine of the cup-feed type. In Figs. 5 and 6, the intermittently rotated feed cups of the machine are designated by the numerals 10 and 11, while the fabric penetrating needle and its cooperative looper are designated by the numerals 12 and 13, respectively. In seaming, the flattened toe end of the blank is directed by the operator of the machine between the feed cups 10 and 11 so that the needle 12 penetrates the loops of the contiguous fabric courses which are to be joined by the seam 17. Just before the doubled fabric reaches the feed cups, the excess fabric, including the final courses 9, is cut away, as shown in Fig. 6, by a knife 15 and discarded. Due to the inherent tendency of the severed fabric edges to curl, the remaining courses 8 of the fine yarn roll over, as instanced at 16 in Figs. 5 and 6. Thus, during the seaming, the stitches of the needle thread, penetrating the contiguous fabric, are connected in the usual manner by the over edge stitches of the looper thread, with incidental incorporation of the curls 16 into the resultant seam 17 (see Figs. 2 and 5). As a consequence, the raw fabric edges are securely bound against the possibility of subsequent development of runs. It is to be particularly noted that, due to the use of the finer yarn for the courses 8, the thickness of the seam 17 approximates the thickness of the adjacent reinforced toe fabric 6 and courses 7. Moreover, the seam is disposed within the reinforced toe area at the bottom of the toe, being, therefore, both inconspicuous and devoid of discomfort to the wearer of the stocking.

The seaming may be accomplished with equal facility on any well known dial looping machine, as shown diagrammatically in Figs. 7 and 8. In these latter illustrations, the dial points are designated by the numeral 20, the fabric penetrating needle by the numeral 21 and the trimming knife, which is disposed ahead of the needle 21 in the direction of the movement of the dial (indicated by the arrow), by the numeral 22. (The looper is not shown.) For the purpose of clarity, only one layer of the contiguous fabric layers is shown in Fig. 8. In the seaming in this instance, the contiguous loops of the courses 8 are impaled upon the points 20 of the machine along a more or less straight or horizontal line adjacent or spaced slightly from the courses 7. As the fabric, impaled upon the points 20, moves past the knife 22, the excess fabric, including the loopers rounds 9, is cut away (see Fig. 8), whereupon the cut edges of the fabric portion 8 curl over as they approach the needle 21 which, in cooperation with the usual looper (not shown) forms a stitched seam 17 tightly binding in the curls 16 (see Figs. 2 and 7) of the courses 8 in a manner familiar to those skilled in the art.

While it is preferred that the points 20 of the machine be inserted into the loops of the fine yarn fabric 8, as shown in Figs. 7 and 8, it is entirely practical, in the practice of my invention, to insert the points 20 into the loops of the heavy yarn fabric 7 along a line adjacent or spaced slightly from the light yarn courses 8. Similarly, the points 20 may be inserted initially into loops of the fine yarn fabric 8, but near the terminal end of the seam 17 the points 20 may be inserted into loops of the heavy yarn fabric 7, so that the resulting stitch crosses from the light yarn fabric area 8 to the heavy yarn fabric area 7.

It is to be particularly noted in connection with the practice of my invention as illustrated in Figs. 7 and 8 that it is not essential, nor even necessary, for the points 20 to penetrate predetermined loops of the contiguous fabric prior to seaming. Rather, the points may be inserted promiscuously into the loops of the courses 8 or 7 of the fabric, thereby greatly expediting and simplifying the toe closure operation for seamless hosiery. While the points 20 should be inserted in the fabric along a more or less continuous line, it is not necessary that the points 20 successively penetrate successive loops in the same course, nor successive wales. Because the curled over portions 16 of the contiguous fabrics are bound into the seam 17 itself, the development of runs in the seamed fabric is precluded. Thus, it is possible to seam the fabric by promiscuous insertion of the points 20 in the manner above described.

In the seaming of the toe opening, it is not necessary that the excess fabric beyond the seam 17 be trimmed prior to or concurrently with the seaming operation. It is entirely practical, if desired, to remove the excess fabric following seaming by any appropriate means. In all cases, however, it is the purpose of my invention to form a small, indistinct seam, into which the remaining fine yarn courses 8 are bound, for closing the stocking blank. The small seam results from the use of the fine yarn in forming the courses 8, and from stitching the seam across these courses by inserting the stitching needle either into the fine yarn courses 8 themselves, or into the adjacent heavy yarn courses.

Following the seaming operation, the stocking is preboarded in the usual manner so as to impart the proper shape thereto, following which the stocking is dyed and finished in the usual manner.

It is to be understood that it is within the scope of my invention to knit the main portion of the stocking of Figs. 1 and 3 from plural ends of yarn, and to form the courses 8 from one or more of such yarns. For example, the leg and instep portions could be knit of two ends of ten denier nylon, which is the equivalent of one end of twenty denier nylon, and the courses 8 could be knit of a single end of ten denier nylon. Or, further by way of example, the leg and instep portions could be knit of three ends of seven denier nylon, while the courses 8 could be knit of one end of either seven or ten denier nylon or of two ends of seven denier nylon.

While the embodiment of this invention, as respects circular knitting, has been described with relation to ladies' seamless hosiery, it is to be understood that the invention is equally applicable to the knitting of half hose, knee length stockings, anklets, etc. for men, women and children. Additionally, the invention is applicable to the knitting of other types of garments, such as sweaters and leotards, on circular knitting machines. In the knitting of sweaters, for example, where separate tubular portions are united by seaming, such as an arm to the body portion of the garment, the end of the arm tube to be seamed onto the main body portion may be finished off with any desired number of courses of light yarn which, in the seaming operation, are rolled into the seam.

In the alternative embodiment of the invention illustrated in Figs. 9–12, the toe 6a of the stocking is closed by a seam 17a extending centrally of the bottom of the foot rearwardly of the toe tip to the sole of the foot. In knitting the toe portion of this alternative embodiment, first a gore 25 is knit by reciprocation of the needle cylinder in the usual manner, to form a toe pocket. After completion of the gore 25, all of the needles are put back into action and continuous knitting is resumed, by rotation of the needle cylinder, to form a tubular extension 25a. The first few courses of the tubular extension 25a are knit of the yarn used in the formation of the gore 25 plus a fine yarn, preferably of a denier smaller than the denier of any yarn previously used in the knitting of the stocking blank. As the knitting of tubular extension 25a proceeds, the yarn feed or feeds delivering the yarn or yarns which formed the gore 25a are periodically withdrawn, during the knitting of successive courses, for increasing intervals of time. As a result, two separate and distinct fabric areas 26 and 27 are formed in the extension 25a, the two areas being defined by the line 28 along which they are contiguous. As knitting of the tubular extension 25a proceeds, the portions of the courses knit of the gore yarn or yarns are diminished to zero, following which the courses of the tubular extension are knit solely of the fine denier yarn. Only a relatively few courses of the tubular extension 27 are knit of the fine yarn only, preferably from two to six courses, although any convenient number will suffice, following which the usual looper rounds 9a are knit.

Figure 12:
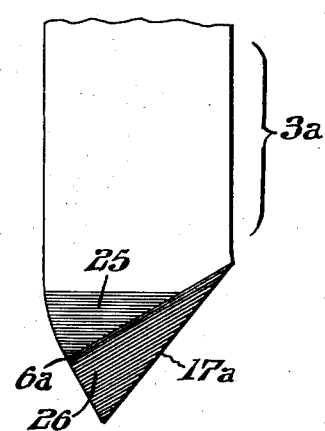
Fig. 12 is a view similar to Fig. 11 showing how the toe end of the blank is shaped following trimming and seaming.

After the stocking blank is removed from the knitting machine, the foot portion 3a is flattened, as shown in Figs. 11 and 12, so that the line 28 in one half of the fabric is coincident with the line 28 in the other half thereof, and so that the loops in the portion 27 of the tubular extension 25a are in contiguous relation. Thereafter, the stocking blank is closed by a seam 17a in the manner illustrated in Figs. 5 and 6, or Figs. 7 or 8, or in any other well known manner. In seaming the toe portion of the stocking blank shown in Figs. 11 and 12, the needle of the seaming machine preferably is inserted in the light fabric portion 27 of the tubular extension 25a along a line substantially adjacent or slightly spaced from the line 28, with resultant formation of the seam 17a shown in Fig. 12, the fabric beyond the seam 17a being cut off either during the seaming operation or immediately thereafter. If desired, however, the needle of the seaming machine may be inserted in the heavy fabric portion 26 along a line substantially adjacent the line 28, or spaced slightly therefrom, in formation of the seam 17a.

Figure 9:
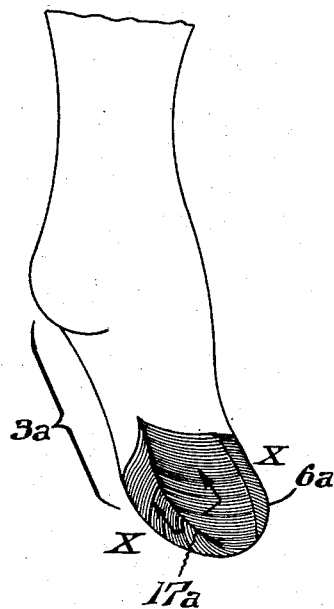
Fig. 9 is a fragmentary view in perspective of the foot of a seamless stocking having a modified toe construction closed and seamed in accordance with my invention.
Figure 10:
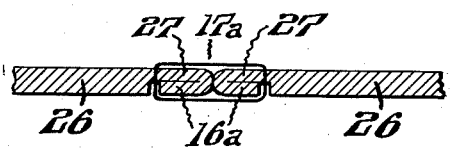
Fig. 10 is a fragmentary, diagrammatic view in section taken as indicated by the angled arrows X—X in Fig. 9 crosswise through the closure seam of the toe portion.

Following the seaming operation and removal of the excess fabric, the stocking blank is preboarded, dyed and finished in the usual manner. A cross-section of the seam 17a of the finished stocking of Fig. 9 is illustrated diagrammatically in Fig. 10.

If desired, in the stocking of Figs. 9–12 a second toe gore may be knit, in the usual manner, to form a toe pocket similar to toe pocket 6 of Fig. 3. In knitting the toe pocket 6 and the gore 25, either a single heavy yarn may be used, or else the main body yarn of the stocking may be used together with an additional reinforcing yarn. For example, instead of using a single fifty denier nylon yarn, the toe pocket 6 and the gore 25 may be knit of a fifteen denier main body yarn and an additional forty denier reinforcing yarn. In the event the latter yarns are used, the courses 7 of Fig. 3 and the fabric area 26 of Fig. 9 preferably shall include these yarns.

Figure 15:
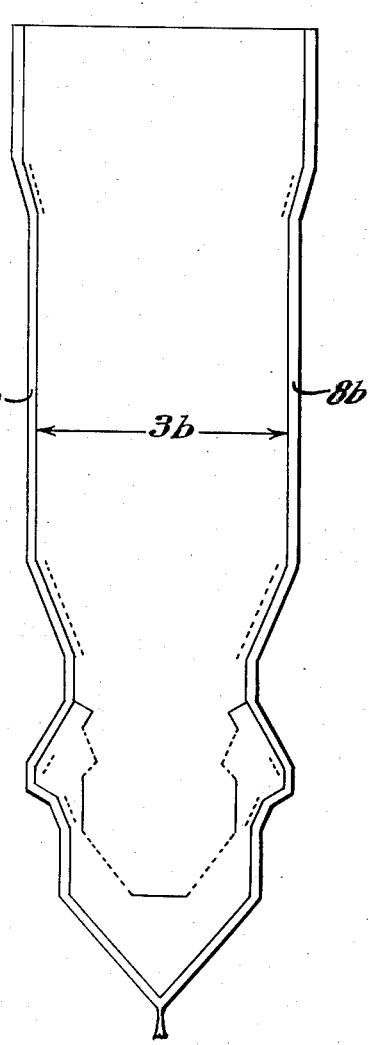
Fig. 15 shows the flat knitted fabric blank for the stocking of Fig. 13 as produced on a straight knitting machine of the "cotton" type.
Figure 13:
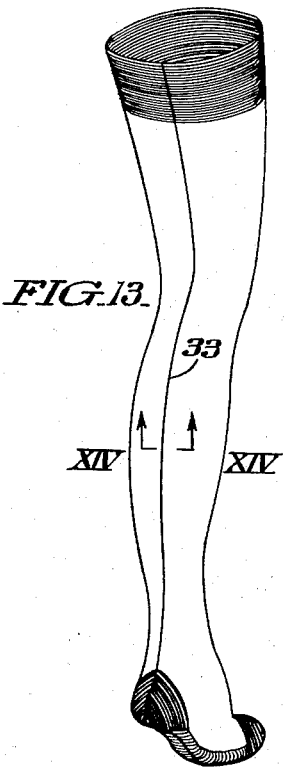
Fig. 13 is a perspective view of a full fashioned stocking seamed in accordance with my invention.

For the full fashioned stocking illustrated in Fig. 13 I produce, upon a straight knitting machine of the "Cotton" type, the flat, profiled blank shown in Fig. 15. During the knitting of the blank, I may use, for example, as diagrammatically shown in Fig. 16, two yarn carriers 30 and 31. The two carriers are traversed crosswise of the needles 32, the carrier 30 between the limits A—B and the carrier 31 between the limits C—D. As a result, narrow selvage edge margins 8b are formed from the yarn of carrier 31 at opposite sides of the blank. The margins 8b are only a few needles or wales in width, preferably two to six in number, although any convenient number will suffice. It is to be understood, of course, that the excess traverse of the carrier 31 relative to that of the carrier 30 is maintained constant throughout the shaping of the blank so that the edge margins 8b extend uniformly from the top of the blank to the tip of the toe.

Any combination of yarns may be used in the knitting of the fabric in the manner illustrated in Fig. 16. For example, both carriers 30 and 31 could feed ten denier nylon yarn, with the result that the main portion or body 3b of the fabric blank is formed, for all practical purposes, or twenty denier nylon yarn while the marginal edge portions 8b are formed of ten denier nylon yarn. Or, by way of further example, the carrier 30 may feed ten denier nylon yarn and the carrier 31 may feed seven denier nylon yarn.

Figure 14:
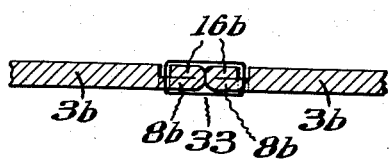
Fig. 14 is a fragmentary, diagrammatic view in section taken as indicated by the angled arrows XIV—XIV in Fig. 13 crosswise through the closure seam.

After the blank is removed from the knitting machine, it is folded about its longitudinal median to bring the margins 8b into contiguous relation. Meanwhile, the selvages of the margins 8b naturally will curl over, as indicated at 16b in Fig. 14. The contiguous, curled margins 8b may be seamed together on either the cup feed sewing machine of Figs. 5 and 6, or the dial machine of Figs. 7 and 8, or in any other manner known in the art. In any event, the feeding of the contiguous margins 8b into the machine is so controlled that the needle preferably penetrates the loops of the contiguous margins 8b along a line substantially adjacent the body portion 3b. Thus, the finished seam 33, as shown in Fig. 14, will approximate or slightly exceed the thickness of the adjacent fabric. If desired, however, the needle of the seaming machine may be inserted in the main fabric portion 3b along a line substantially adjacent or spaced slightly from the contiguous margins 8b, provided only the seam 33 overlaps the margins 8b.

In the modification shown in Fig. 17, I employ a carrier 35 for feeding the body yarn, and two auxiliary carriers 36 and 37 for feeding finer auxiliary yarns to form the edge margins 8c. The carrier 35 traverses between the limits C—D, to knit the main body portion 3c, and the carriers 36 and 37 traverse between shorter limits E—C and D—F, respectively, for knitting the margins 8c. The travel of the carriers 36 and 37 overlap that of the carrier 35 to the extent of a few needles at the points C and D in order to bind together the body yarn and the fine auxiliary yarns. This overlap of the carriers should be kept at a minimum, and preferably should be no more than two needles in width. Seaming of the flat stocking blank of Fig. 17 is accomplished in the same way as above described in connection with Figs. 13–15.

After seaming of the blanks of Figs. 13–17, the stocking is preboarded and finished in the usual manner.

It is to be understood, of course, that the illustration of my invention in Figs. 13 to 17 may readily be extended to any type of flat knitted fabric, such as leotards, panties, etc.

The above described embodiments of my invention are to be considered in all respects merely as illustrative thereof and not restrictive; reference being had to the appended claims, rather than to the foregoing description as indcating the true scope of my invention.

Having thus described my invention, I claim:

1. In the production of a circular knit stocking, the steps of knitting the instep and toe portions of the stocking blank; thereafter knitting courses from a yarn finer than any yarn previously used in the knitting of the blank; thereafter flattening the toe end of the blank to bring the courses of said finer yarn into contiguous relation; and closing the blank by stitching a seam across said finer yarn courses.

2. The method of claim 1 wherein a toe pocket is knit in the stocking blank prior to knitting said finer yarn courses.

3. The method of claim 2 wherein the toe pocket is knit of a yarn heavier than the yarn of which the instep portion of the stocking blank is knit; and wherein, following knitting of the toe pocket, courses are knit of the heavier yarn.

4. In the production of a circular knit stocking, the steps of knitting the instep and toe portions of the stocking blank; thereafter knitting courses of loops from plural strands of yarn, one strand comprising a yarn finer than any yarn previously used in the knitting of the stocking blank; thereafter periodically withdrawing all strands of yarn except the finer yarn for increasing intervals of time during the knitting of successive courses until the finer yarn alone is being knit; flattening the stocking blank to bring loops of the finer yarn into contiguous relation; and closing the blank by stitching a seam across the contiguous finer yarn loops.

5. The method of claim 4 wherein a toe pocket is knit in the stocking blank prior to knitting any courses containing the finer yarn.

6. In the production of a circular knit stocking, the steps of knitting the instep and toe portions of the stocking blank from yarn of selected size; thereafter knitting courses from a yarn finer than the yarn used in knitting the toe portion; thereafter flattening the toe end of the blank to bring the courses of said finer yarn into contiguous relation; and closing the blank by stitching a seam across said finer yarn courses.

7. In the production of a circular knit stocking, the steps of knitting the instep and toe portons of the stocking blank from yarn of selected size; thereafter knitting courses of loops from plural strands of yarn, one strand comprising a yarn finer than the yarn used in knitting the toe portion; thereafter periodically withdrawing all strands of yarn except the finer yarn strand for increasing intervals of time during the knitting of successive courses until the finer yarn alone is being knit; flattening the stocking blank to bring loops of the finer yarn into contiguous relation; and closing the blank by stitching a seam across the contiguous finer yarn loops.

8. In a circular knit stocking formed with a leg portion, a toe portion and a toe opening, a plurality of courses approximate the toe opening and between the toe opening and the toe portion composed of yarn smaller in size than the yarn used in knitting any other portion of the stocking, and a seam overlapping said courses to close the toe opening.

9. The invention of claim 8 wherein the seam is substantially equal in thickness to the thickness of the fabric of the toe portion of the stocking.

10. In a circular knit stocking formed with a toe and a toe opening, said toe composed of fabric knit of yarn of a selected size, a plurality of courses approximate the toe opening and between the toe opening and toe composed of yarn smaller in size than the yarn used in knitting the toe fabric of the stocking, and a seam overlapping said courses to close the toe opening, said seam being substantially equal in thickness to the thickness of the toe fabric.

References Cited in the file of this patent

UNITED STATES PATENTS

| | | |
|---|---|---|
| 1,192,800 | Scott | July 25, 1916 |
| 1,778,221 | Mack | Oct. 14, 1930 |
| 2,181,836 | Smetana | Nov. 28, 1939 |
| 2,305,218 | Hemmerich | Dec. 15, 1942 |
| 2,636,369 | Tait | Apr. 28, 1953 |
| 2,699,056 | Margulies | Jan. 11, 1955 |
| 2,806,367 | Bolles et al. | Sept. 17, 1957 |
| 2,821,847 | Getaz | Feb. 4, 1958 |
| 2,825,215 | Buckreus | Mar. 4, 1958 |
| 2,925,725 | Urlaub | Feb. 23, 1960 |